(No Model.) 2 Sheets—Sheet 1.
J. T. WATKINS.
RAKE FOR CONDUCTING GRAIN TO THRASHING MACHINES.
No. 321,067. Patented June 30, 1885.
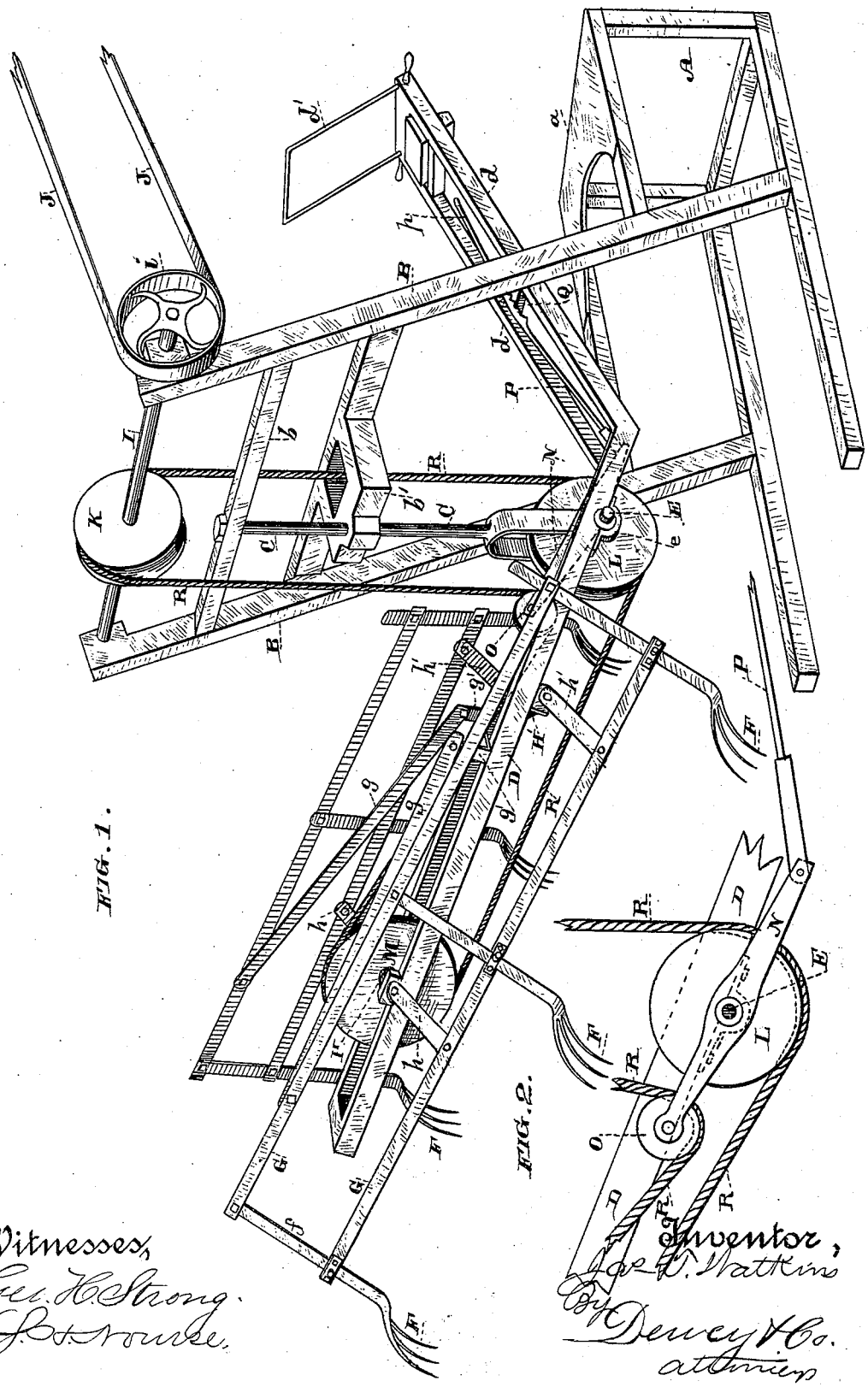

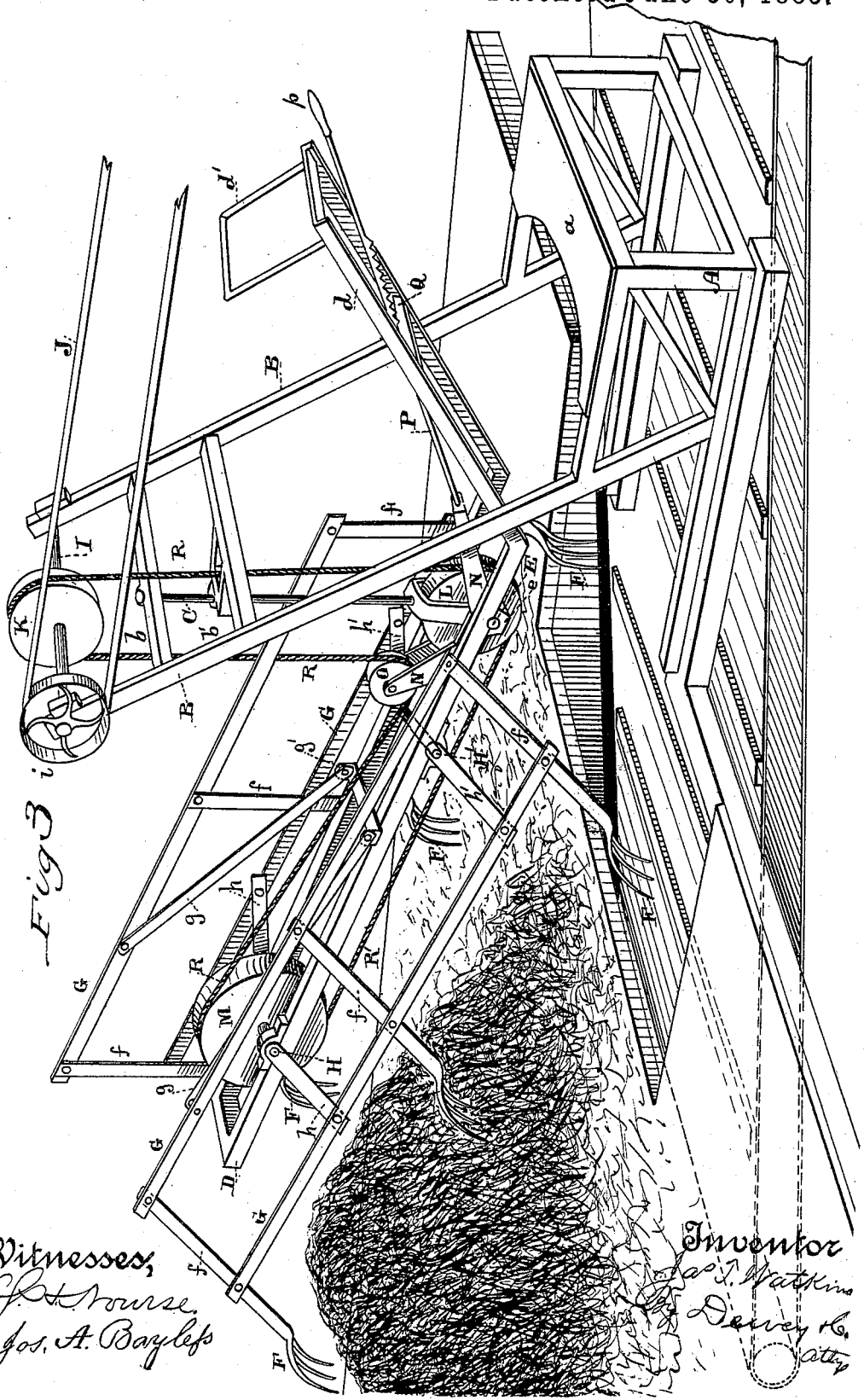

UNITED STATES PATENT OFFICE.

JAMES T. WATKINS, OF SAN FRANCISCO, CALIFORNIA, ASSIGNOR TO BYRON JACKSON, OF SAME PLACE.

RAKE FOR CONDUCTING GRAIN TO THRASHING-MACHINES.

SPECIFICATION forming part of Letters Patent No. 321,067, dated June 30, 1885.

Application filed July 18, 1884. (No model.)

*To all whom it may concern:*

Be it known that I, JAMES T. WATKINS, of the city and county of San Francisco, and State of California, have invented an Improvement in Rakes for Conducting Grain to Thrashing-Machines; and I hereby declare the following to be a full, clear, and exact description thereof.

My invention relates to a new and useful rake for conducting grain to thrashing-machines.

The object of my invention is to feed or advance the cut grain from the derrick-platform upon which it is deposited by the derrick-forks to the elevator, by which it is carried to the separator or thrashing-machine.

My invention consists in the combination of devices hereinafter described and claimed.

Referring to the accompanying drawings, Figure 1 is a perspective view of my invention. Fig. 2 is a detail of construction. Fig. 3 is a perspective view showing my device attached to the platform of a derrick-wagon, and showing the elevator which passes from the wagon to the separator.

A is a base-frame having a platform, $a$, upon which the operator is to stand.

B are two inclined standards, from a cross-bar, $b$, of which depends a rod, C, which forms the pivot or axial center by which the horizontal movement of the frame D takes place. The upper end of this rod is provided with a head, by which it is hung, and it passes loosely enough through bar $b$ and a bearing, $b'$, lower down, to adapt it to turn in its journals to permit the horizontal swing or movement of frame D. The frame D is preferably a rectangular one, having a rearwardly-extending and upwardly-inclined portion, $d$, provided with a handle or bail, $d'$. This frame is secured to the lower forked end of pivot-rod C by means of the pivot-bolt E, which passes through the end of the rod and is journaled in boxes $e$ and under the frame, whereby the frame D is pivoted to the rod in a manner adapting it to have a vertical swing or movement.

F are the forks, here shown as three on a side, though their number may be increased or diminished, if required. The handles or shanks $f$ of these forks are connected by the bars G, the upper ones of which have pivoted to them the bars $g$, the other ends of which are pivoted to a block or bearing, $g'$, on the frame D. Mounted transversely near the forward end of frame D is a shaft, H, having cranks $h$ connected with the lower bars, G, and H' is a similar shaft mounted near the rear of the frame and having cranks $h'$, likewise connected with bars G, whereby the forks are supported. Mounted across the top of standards B is a shaft, I, having pulley $i$, to which power is applied by belt J, and having also a pulley, K. In the forked lower end of the pivot-rod C is a pulley, L, and upon the shaft H is a pulley, M. Pivoted to the side of the lower end of rod C is a lever, N, carrying on its forward end a tightener-pulley, O. To its rear end is attached a rod, P, having a toothed under edge and a handle, $p$. This rod passes over a cross-bar, Q, with which its toothed edge engages to hold it at any place when said rod is pulled up to depress the tightener-pulley.

R is the endless driving rope, cable, or belt It passes down over and in front of pulley K under the tightener, forward over, around, and under pulley M, and back under and up behind pulley L to the place of beginning. By these means the forks are given a reciprocating curvilinear motion very similar to, though not identical with, the motion imparted to the forks in Letters Patent of the United States No. 146,625, dated January 20, 1874, issued to me jointly with J. S. Scott.

The particular position I intend for the device is on the derrick-wagon, in such relation to the derrick-platform and to the elevator which passes from the wagon to the separator that by the operation of the forks the grain is raked or pulled from where it is deposited on the platform by the usual derrick-forks to the elevator, by which it is carried to the separator. I do not, however, confine myself to so locating it, as it may be placed over the elevator nearer the separator, whereby it may act in the capacity of a true feeder, in contradistinction to that function from which I have derived its name of "hoe-down."

Its use as a rake is what necessitates the adjustments which I have provided for the forkcarrying frame D. The quantity of grain taken by the derrick-forks from the stacks on each side is great enough to keep several men at work on the derrick-platform raking down from the pile deposited, to the elevator. These men I dispense with entirely and substitute my machine. It is of course necessary that its forks shall be able to reach the whole front and every part of the deposited pile, to pick the grain from its sides, from its center, from its top, and from its base, and to get at it all. The operator, standing on platform $a$, facing the work, sees exactly where to direct his forks, and by moving the lever portion $d$ of the frame D he either swings the forks through a horizontal sweep or a vertical one, or through one practically uniting both, whereby he reaches wherever desired, and the forks carry the grain back to and upon the elevator.

Having thus described my invention, what I claim as new, and desire to secure by Letters Patent, is—

1. In a rake for conducting grain to a thrashing-machine, the combination, with a supporting-frame and a swiveling suspended frame adapted to be turned to various inclinations horizontally and vertically, of forks having shanks, connecting-bars for said forks, and means whereby said forks are adapted to engage and advance the grain, substantially as described.

2. In a rake for conducting grain to thrashing-machines, a supporting-frame and the swiveling suspended frame, in combination with the forks F, having shanks $f$, connecting-bars for said forks, and a mechanism, as described, for operating the forks continuously during the swiveling of the frame, substantially as described.

3. In a rake for conducting grain to thrashing-machines, the combination of the supporting-frame, the swiveling frame D, having an extension, $d$, whereby said frame is readily swiveled to various inclinations horizontally and vertically, and forks mounted on said frame for engaging and advancing the grain, substantially as herein described.

4. In a rake for conducting grain to thrashing-machines, the combination, with supporting-frame, the frame D, and forks mounted thereon for engaging and advancing the grain, of an oscillating forked suspension or pivot rod C, whereby said frame may be horizontally or vertically inclined, as herein described.

5. The combination, in a rake for conducting grain to thrashing-machines, of the frame A, standards B, depending oscillating pivot-rod C, frame D, pivoted horizontally to the lower end of rod C, devices for engaging and advancing the grain, and the extension $d$ of the frame D, substantially as herein described.

6. In a rake for conducting grain to thrashing-machines, the supporting-frame A and swiveling frame D, in combination with a series of forks, F, carried by the frame D, and a mechanism for imparting to the forks a reciprocating curvilinear motion, substantially as herein described.

7. In a rake for conducting grain to thrashing-machines, the supporting-frame A and swiveling frame D, in combination with a series of forks, F, bars G, and connecting-bars $g$, as described, and the rotating crank-shafts H H', substantially as herein described.

8. In a rake for conducting grain to thrashing-machines, the supporting-frame A, the rod C, pivoted vertically in said frame, the frame D, pivoted horizontally in the lower end of the rod, whereby it is swiveled horizontally and vertically, and the lever $d$ by which said frame is operated, in combination with the independent series of connected and swinging forks F, carried by the frame D, the crank-shafts H H', and bars G $g$, substantially as herein described.

9. In a rake for conducting grain to thrashing-machines, the frame A, standards B, pivot-rod C, having a forked lower end, the swinging frame D, pivoted to and suspended by rod C and having extension $d$, the series of forks connected with each other and with frame D, and the means for operating the forks, consisting of the crank-shafts H H', the driving shaft I, and endless rope R, operating on suitable pulleys, substantially as herein described.

10. In a rake for conducting grain to thrashing-machines, the pivot-rod C, the suspended and swiveling frame D, having extension $d$, forks F, carried by said frame, the crank-shafts H H', and endless rope, cable, or belt R, operating on suitable pulleys to drive the shafts, in combination with a pivoted bent lever, N, having tightener-pulley O and handle-rod P, adapted to engage with a bar, Q, on the lever $d$, substantially as herein described.

In witness whereof I have hereunto set my hand.

JAMES T. WATKINS.

Witnesses:
C. D. COLE,
J. H. BLOOD.